United States Patent
Teplitsky et al.

(10) Patent No.: US 9,106,502 B2
(45) Date of Patent: Aug. 11, 2015

(54) APPARATUS, SYSTEM AND METHOD OF IN-PHASE/QUADRATURE (I/Q) IMBALANCE COMPENSATION

(71) Applicant: Intel Corporation, Santa Clara, CA (US)

(72) Inventors: Moshe Teplitsky, Tel-Aviv (IL); Elan Banin, Raanana (IL); Michael Genossar, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 147 days.

(21) Appl. No.: 13/680,137

(22) Filed: Nov. 19, 2012

(65) Prior Publication Data

US 2014/0140379 A1    May 22, 2014

(51) Int. Cl.
| | |
|---|---|
| *H04L 27/18* | (2006.01) |
| *H04L 27/36* | (2006.01) |
| *H04L 27/38* | (2006.01) |
| *H04B 17/21* | (2015.01) |
| *H04B 1/30* | (2006.01) |

(52) U.S. Cl.
CPC .............. *H04L 27/364* (2013.01); *H04B 17/21* (2015.01); *H04L 27/3863* (2013.01); *H04B 1/30* (2013.01)

(58) Field of Classification Search
CPC .. H04B 1/30; H04L 27/3863; H04L 27/2647; H04L 27/364; H03D 3/009; H03D 7/165
See application file for complete search history.

(56) References Cited

U.S. PATENT DOCUMENTS

| | | | | |
|---|---|---|---|---|
| 7,856,048 | B1 * | 12/2010 | Smaini et al. ................. | 375/221 |
| 8,351,492 | B2 * | 1/2013 | Ly-Gagnon .................... | 375/221 |
| 2011/0075715 | A1 * | 3/2011 | Kravitz ........................... | 375/221 |
| 2011/0292978 | A1 * | 12/2011 | Kravitz ........................... | 375/221 |

OTHER PUBLICATIONS

Wireless-Gigabit-Alliance (WGA) specifications (Wireless Gigabit Alliance, Inc WiGig MAC and PHY Specification Version 1.0, Final specification), Apr. 2010.
IEEE Std 802.11™-2012. Part 11: Wireless LAN Medium Access Control (MAC) and Physical Layer (PHY) Specifications, IEEE Standard for Information technology. Telecommunications and information exchange between systems Local and metropolitan area networks-Specific requirements, Mar. 29, 2012.

* cited by examiner

*Primary Examiner* — Shuwang Liu
*Assistant Examiner* — Ross Varndell
(74) *Attorney, Agent, or Firm* — Shichrur & Co.

(57) ABSTRACT

Some demonstrative embodiments include apparatuses, systems and/or methods of In-phase/Quadrature (I/Q) imbalance compensation. For example, an apparatus may include an I/Q imbalance calibrator to determine, based on first and second phasors, a plurality of calibration parameters for calibrating I/Q imbalance of both a Radio Frequency (RF) Receive (Rx) path of a transceiver and a RF Transmit (Tx) path of the transceiver, the first phasor including a phasor of an image component of a first signal transmitted via the Tx path, shifted by a first phase shift and received via the Rx path, and the second phasor including a phasor of an image component of a second signal transmitted via the Tx path, shifted by a second phase shift, different from the first phase shift, and received via the Rx path.

23 Claims, 6 Drawing Sheets

APPARATUS, SYSTEM AND METHOD OF IN-PHASE/QUADRATURE (I/Q) IMBALANCE COMPENSATION

BACKGROUND

A Radio-Frequency (RF) transceiver of a wireless communication device may include two physically separate baseband branches to generate high-frequency in-phase (I) and quadrature (Q) signals, e.g., at phases of 0° and 90°. This configuration results in an inherent I/Q imbalance.

The I/Q imbalance should be calibrated, in order to achieve a required level of accuracy in terms of phase and/or gain, e.g., of a Transmit (Tx) path and a Receiver (Rx) path of the transceiver.

Transmitter imbalance calibration may be performed by generating a Single Side Band (SSB) signal in a digital domain of the transceiver, using an envelope detector to detect the presence of I/Q imbalance, and applying an iterative loop to minimize the detected imbalance.

Receiver imbalance calibration may be preformed by using an external test-equipment (TE) source to inject an SSB signal into the receiver path, and performing measurements in the digital domain to calculate the required correction coefficients for the I/Q imbalance.

Alternatively, the receiver imbalance calibration may include calibrating the transmitter, and using the transmitter for generating a reference SSB signal to be injected into the receiver.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
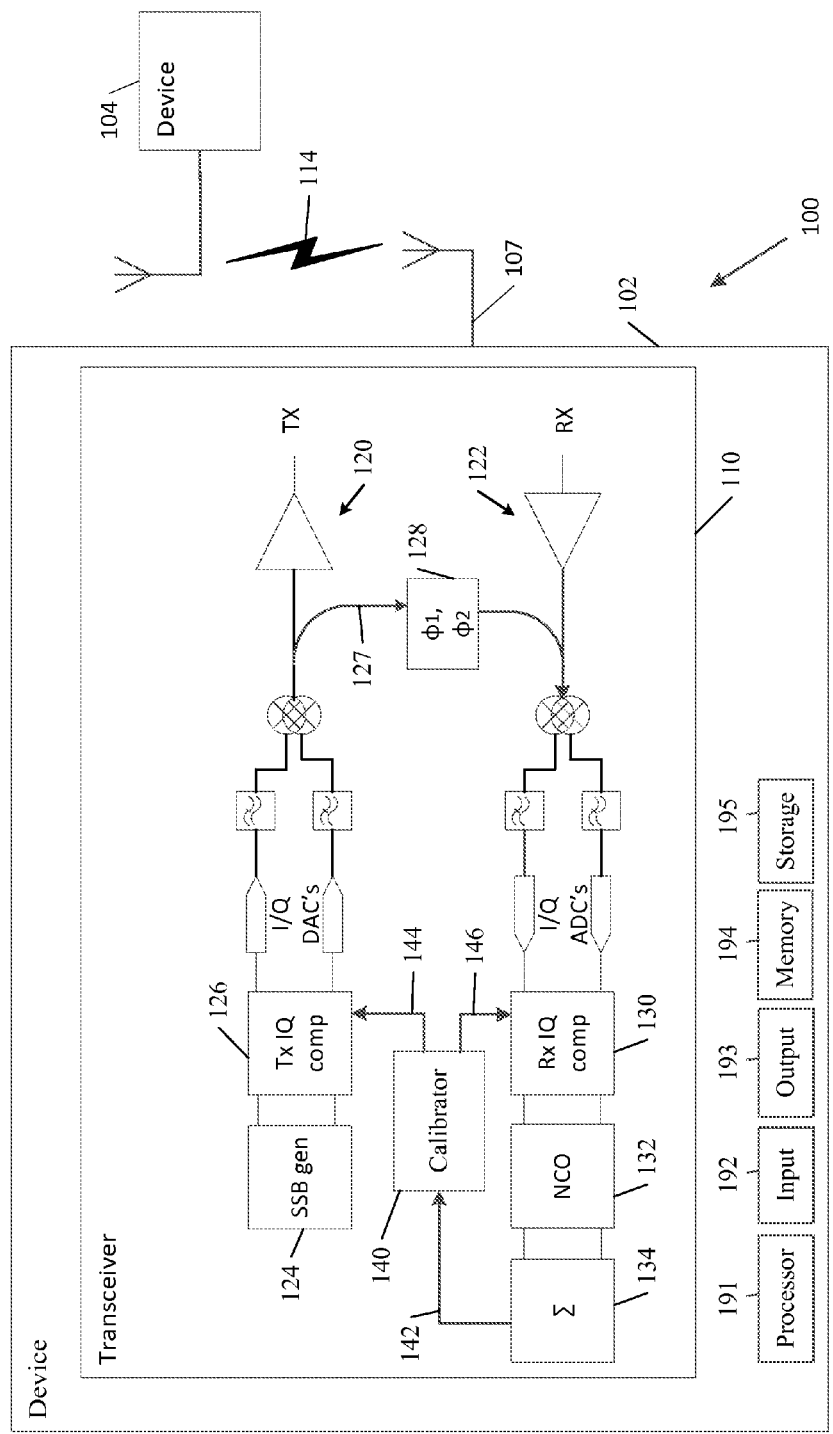
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA or WiGig) specifications (Wireless Gigabit Alliance, Inc WiGig MAC and PHY Specification Version 1.0, April 2010, Final specification) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2102*; IEEE802.11 task group ac (TGac) ("*IEEE*802.11-09/0308r12—*TGac Channel Model Addendum Document*"); IEEE 802.11 task group ad (*TGad*)

(*IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band*), and/or future versions and/or derivatives thereof, devices and/or networks operating in accordance with existing IEEE 802.16 standards (*IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m*) and/or future versions and/or derivatives thereof, devices and/or networks operating in accordance with existing Wireless-WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The phrase "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit. In another example, communicating an RF signal over an RF path may include transmitting the signal over an RF transmit (Tx) path or receiving the signal over an RF receive (Rx) path.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The term "station" (STA), as used herein, may include any logical entity that is a singly addressable instance of a medium access control (MAC) and a physical layer (PHY) interface to a wireless medium (WM).

The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

Reference is now made to FIG. 1, which schematically illustrates a block diagram of a system 100, in accordance with some demonstrative embodiments.

In some demonstrative embodiments, system 100 may include one or more wireless communication devices, e.g., wireless communication devices 102 and/or 104, capable of communicating content, data, information and/or signals over at least one suitable wireless communication channel 114, for example, a radio channel, an IR channel, a RF channel, a Wireless Fidelity (WiFi) channel, and the like. In one example, channel 114 may include a DMG channel. One or more elements of system 100 may optionally be capable of communicating over any suitable wired communication links.

In some demonstrative embodiments, wireless communication devices 102 and/or 104 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, cellular telephone, a handset, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, a gaming device, an audio amplifier, a data source, a data sink, a Digital Still camera (DSC), a media player, a Smartphone, a television, a music player, an AP, a base station, or the like.

In some demonstrative embodiments, wireless communication devices 102 and/or 104 may perform the functionality of DMG stations. For example, wireless communication devices 102 and/or 104 may be configured to communicate over the DMG band.

In other embodiments, wireless communication devices 102 and/or 104 may communicate over any other channel and/or according to any other technology, e.g., WiFi, Wimax, LTE, Bluetooth or any other technology.

In some demonstrative embodiments, wireless communication devices 102 and/or 104 may include at least one transceiver 110 to perform wireless communication between wireless communication devices 102 and 104 and/or with one or more other wireless communication devices, e.g., as described below. Transceiver 110 may transmit and/or receive wireless communication signals, RF signals, frames, blocks, transmission streams, packets, messages, data items, and/or data. In one example, transceiver 110 may include or may be implemented as part of a wireless Network Interface Card (NIC), and the like.

In some demonstrative embodiments, transceiver 110 may include, or may be associated with, one or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beam-forming techniques. For example, antennas 107 may include a phased array antenna, a single element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, wireless communication device 102 may also include, for example, one or more of a processor 191, an input unit 192, an output unit 193, a memory unit 194, and a storage unit 195. Wireless communication device 102 may optionally include other suitable hardware components and/or software components. In some demonstrative embodiments, some or all of the components of each of wireless communication devices 102 and/or 104 may be enclosed in a common housing or packaging, and may be interconnected or operably associated using one or more wired or wireless links. In other embodiments, components of each of wireless communication device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102 and/or of one or more suitable applications.

Input unit 192 includes, for example, a keyboard, a keypad, a mouse, a touch-pad, a track-ball, a stylus, a microphone, a touch-screen, and/or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, and/or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication device 102.

In some demonstrative embodiments, transceiver 110 may include an RF Transmit (Tx) path 120 to transmit signals via one or more of antennas 107, and an RF Receive (Rx) path 122 to receive signals via one or more of antennas 107. Tx path 120 and Rx path 122 may include any suitable elements for handling RF signals, e.g., one or more amplifiers, filters, conductive paths, transmit lines, receive lines, RF chains, and the like.

In some demonstrative embodiments, transceiver 110 may include an I/Q imbalance calibrator 140 to determine a plurality of calibration parameters for calibrating I/Q imbalance of both Tx path 120 and Rx path 122, e.g., as described in detail below.

In some demonstrative embodiments, transceiver 110 may include a Tx I/Q imbalance compensator 126 to apply a plurality of Tx calibration parameters to Tx path 120. For example, Tx I/Q imbalance compensator 126 may be implemented as part of Tx path 120.

In some demonstrative embodiments, transceiver 110 may include an Rx I/Q imbalance compensator 130 to apply a plurality of Rx calibration parameters to Rx path 122. For example, Rx I/Q imbalance compensator 130 may be implemented as part of Rx path 122.

In some demonstrative embodiments, I/Q imbalance calibrator 140 may determine plurality of calibration parameters including the plurality of Tx calibration parameters for calibrating I/Q imbalance of Tx path 120, and/or the plurality of Rx calibration parameters for calibrating I/Q imbalance of Rx path 122, e.g., as described below.

In some demonstrative embodiments, I/Q imbalance calibrator 140 may determine the plurality of calibration parameters based on a first signal transmitted via Tx path 120, shifted by a first phase shift and received via Rx path 122, and a second signal transmitted via Tx path 120, shifted by a second phase shift, different from the first phase shift, and received via Rx path 122, e.g., as described below.

In some demonstrative embodiments, transceiver 110 may be configured to shift a phase of the second signal, after being compensated by Tx I/Q imbalance compensator 126 and prior to being compensated by Rx I/Q imbalance compensator 130, by a predefined phase shift, with respect to a phase of the first signal, after being compensated by Tx I/Q imbalance compensator 126 and prior to being compensated by Rx I/Q imbalance compensator 130. In some demonstrative embodiments, transceiver 110 may be configured to apply the predefined phase shift by applying first and second predefined phase shifts to the first and second signals, respectively. In other embodiments, transceiver 110 may be configured to apply the predefined phase shift in any other manner, e.g., by applying a phase shift to only one of the first and second signals.

In some demonstrative embodiments, transceiver 110 may include a loopback path 127 to couple Tx path 120 to Rx path 122, e.g., to inject a signal transmitted via Tx path 120 back into Rx path 122.

In some demonstrative embodiments, loopback path 127 may include a loopback filter 128 to couple Tx path 120 to Rx path 122 with a phase shift, denoted $\phi$, which is switchable between first and second phases, $\phi=\phi_1$ and $\phi=\phi_2$, respectively.

In one example, loopback filter 128 may couple Tx path 120 to Rx path 122 with the phase shift $\theta$, which is switchable between the phases $\phi=0°$ and $\phi=90°$, e.g., as described below. However, in other embodiments, loopback filter 128 may couple Tx path 120 to Rx path 122 with the phase shift $\phi$, which is switchable between any other pair of first and second phases. In one example, the first and second phase shifts may be configured such that a difference between the first and second phase shifts is between 80 degrees and 100 degrees. For example, the first and second phase shifts may be configured such that a difference between the first and second phase shifts is substantially 90 degrees.

In some demonstrative embodiments, the first and second signals may include Single Side Band (SSB) signals. For example, transceiver 110 may include a digital source ("SSB generator") 124 configured to generate the SSB signals.

In some demonstrative embodiments, transceiver 110 may be operated at first and second calibration states, which may be controlled, for example, by calibrator 140.

For example, at the first calibration state, calibrator 140 may cause SSB generator 124 to generate a first SSB signal; calibrator 140 may cause Tx I/Q imbalance compensator 126 to compensate the first SSB signal using the plurality of Tx calibration parameters; calibrator 140 may control loopback filter 128 to couple the first Tx-compensated signal from Tx path 120 into Rx path 122, with a first phase shift; and/or calibrator 140 may cause Rx I/Q imbalance compensator 130 to compensate the first shifted signal using the plurality of Rx calibration parameters.

For example, at the second calibration state, calibrator 140 may cause SSB generator 124 to generate a second SSB signal; calibrator 140 may cause Tx I/Q imbalance compensator 126 to compensate the second SSB signal using the plurality of Tx calibration parameters; calibrator may 140 control loopback filter 128 to couple the second Tx-compensated signal from Tx path 120 into Rx path 122, with a second phase shift, different from the first phase shift; and/or calibrator 140 may cause Rx I/Q imbalance compensator 130 to compensate the second shifted signal using the plurality of Rx calibration parameters.

In some demonstrative embodiments, I/Q imbalance calibrator 140 may determine the plurality of calibration parameters based on a first phasor of an image component of the first signal transmitted via Tx path 120, shifted by the first phase shift and received via Rx path 122, and a second phasor of an image component of the second signal transmitted via Tx path 120, shifted by the second phase shift, and received via Rx path 122, e.g., as described in detail below.

In some demonstrative embodiments, transceiver 110 may include a combination of a Numerically Controlled Oscillator (NCO) 132 and an accumulator 134 to determine the first and second phasors, e.g., as described below. However, in other embodiments, transceiver 110 may include any other elements to determine the first and second phasors.

In some demonstrative embodiments, NCO 132 may be configured to downconvert an output of Rx IQ compensator 130. In one example, NCO 132 may be configured to perform digital down conversion of the output of Rx IQ compensator 130 with a complex exponential according to a tuning frequency, which may be set to a SSB frequency of the SSB signals. For example, NCO 132 may be configured to perform digital down conversion of the output of Rx IQ compensator 130, e.g., as follows:

$$y[n]=x[n]*e^{-jwn} \quad (1)$$

wherein y[n] denotes a downconverted output of NCO 132, wherein x[n] denotes an input of NCO 132, and wherein w denotes the tuning frequency In some demonstrative embodiments, accumulator 134 may generate the first phasor by accumulating an output of NCO 132 responsive to the first SSB signal, e.g., at the first calibration state. Accumulator 134 may generate the second phasor by accumulating an output of NCO 132 responsive to the second SSB signal, e.g., at the second calibration state.

In some demonstrative embodiments, I/Q imbalance calibrator 140 may determine the plurality of calibration parameters based on a sum of a first power of the first phasor and a second power of the second phasor, e.g., a described below. In other embodiments, I/Q imbalance calibrator 140 may determine the plurality of calibration parameters based on another calculation applied to the first and second phasors.

In some demonstrative embodiments, I/Q imbalance calibrator 140 may determine the plurality of calibration parameters to minimize the sum of the first power of the first phasor and the second power of the second phasor.

In some demonstrative embodiments, determining the plurality of calibration parameters to reduce, e.g., minimize, the sum of the first and second powers, may ensure increased compensation and reduced I/Q imbalance impairment for both Tx path 120 and Rx path 122, e.g., as described in detail below.

In some demonstrative embodiments, I/Q imbalance calibrator 140 may determine the plurality of calibration parameters by iterating over phasors of a plurality of pairs of the first and second signals resulting from a plurality of different sets of values of the plurality of calibration parameters, e.g., as described below.

For example, in some demonstrative embodiments, I/Q imbalance calibrator 140 may set the plurality of calibration parameters to a set of values; calibrator 140 may cause SSB generator 124 to generate a first pair of first and second signals; and calibrator 140 may receive from accumulator 134 a first pair of first and second phasors of the first pair of first and second signals resulting from the set of values, e.g., as described below.

In some demonstrative embodiments, I/Q imbalance calibrator 140 may determine a value of a parameter of the plurality of calibration parameters for minimizing the sum of the first pair of phasors; and calibrator 140 may update the set of values based on the determined value of the parameter, e.g., as described below.

In some demonstrative embodiments, I/Q imbalance calibrator 140 may repeat the setting of the plurality of calibration parameters, the determining of the sum of the first and second phasors, the determining of the value of the parameter and the updating the set of values with respect to the updated set of values. For example, I/Q imbalance calibrator 140 may set the plurality of calibration parameters to the updated set of values; calibrator 140 may cause SSB generator 124 to generate a second pair of first and second signals; calibrator 140 may receive from accumulator 134 a second pair of first and second phasors of the second pair of first and second signals resulting from the set of values; calibrator 140 may determine a value of a parameter of the plurality of calibration parameters for minimizing the sum of the second pair of phasors; and calibrator 140 may update the set of values based on the determined value of the parameter.

In some demonstrative embodiments, I/Q imbalance calibrator 140 may determine the value of the parameter for minimizing the sum according to a golden section algorithm, e.g., as described in detail below. In other embodiments, I/Q imbalance calibrator 140 may determine the value of the parameter for minimizing the sum according to any other algorithm.

In some demonstrative embodiments, an asymmetric model may be used for modeling a signal distorted by I/Q imbalance. The signal may include, for example, a signal transmitted via Tx path 120, or a signal received via Rx path 122, e.g., a described below.

For example, the imbalanced signal, denoted $s_{IM}(t)$, may be modeled as follows, e.g., assuming common gain and phase are compensated by a channel estimator of transceiver 110:

$$s_{IM}(t) = \cos(w_{LO}t) - gQ(t)\sin(w_{LO}t + \theta) \qquad (2)$$
$$= \text{Re}\{I(t)e^{w_{LO}t}\} - \text{Im}\{ge^{j\theta}Q(t)e^{w_{LO}t}\}$$

wherein $w_{LO}$ denotes a local oscillator frequency for generating the signal, g denotes a gain imbalance between I and Q branches, and $\theta$ denotes a phase imbalance between the I and Q branches.

Equation 2 may be rewritten, e.g., as follows:

$$s_{IM}(t) = \text{Re}\{(I(t) + jGQ(t))e^{w_{LO}t}\} \qquad (3)$$

wherein:

$$G \triangleq ge^{j\theta} \qquad (4)$$

A complex envelope, denoted $m_{IM}(t)$, of the imbalanced signal $S_{IM}(t)$ may be determined, e.g., as follows:

$$m_{IM}(t) = I(t) + jGQ(t) = \alpha m(t) + \beta m^*(t) \qquad (5)$$

wherein $\alpha$ and $\beta$ denote parameters defined with to the I/Q imbalance parameter G, e.g., follows:

$$\alpha \triangleq \frac{1+G}{2}, \beta \triangleq \frac{1-G}{2} \qquad (6)$$

An In-phase component, denoted $I_{IM}(t)$, and a quadrature component, denoted $Q_{IM}(t)$, of the distorted signal may be represented in matrix form, e.g., as follows:

$$\begin{bmatrix} I_{IM}(t) \\ Q_{IM}(t) \end{bmatrix} = \begin{bmatrix} 1 & -a \\ 0 & b \end{bmatrix} \begin{bmatrix} I(t) \\ Q(t) \end{bmatrix} \qquad (7)$$

wherein:

$$a \triangleq g\sin(\theta)$$
$$b \triangleq g\cos(\theta)$$

In some demonstrative embodiments, an I/Q compensator, e.g., Tx I/Q imbalance compensator 126 and/or Rx I/Q imbalance compensator 130, may be configured to compensate the distorted signal according to an I/Q impairment model represented by Equation 7, e.g., as described below.

Figure 2:
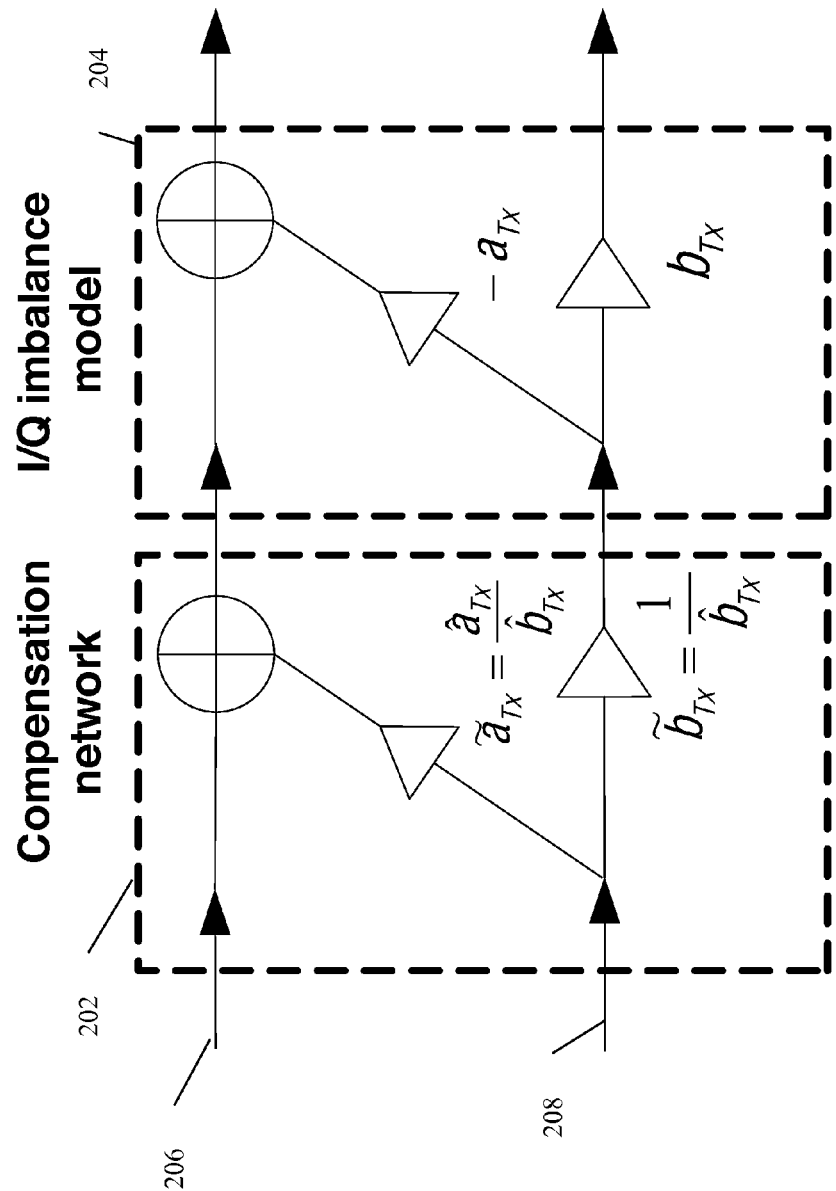
FIG. 2 is a schematic illustration of an In-Phase/Quadrature (I/Q) imbalance compensator corresponding to an I/Q impairment model, in accordance with some demonstrative embodiments.

Reference is made to FIG. 2, which schematically illustrates a digital I/Q imbalance compensator 202 corresponding to an I/Q impairment model 204, in accordance with some demonstrative embodiments. For example, I/Q imbalance compensator 202 may perform the functionality of Tx I/Q imbalance compensator 126 (FIG. 1) and/or Rx I/Q imbalance compensator 130 (FIG. 1).

In some demonstrative embodiments, I/Q impairment model 204 corresponds to applying Equation 7 to an In-phase (I) branch 206 and a quadrature (Q) branch 208.

In some demonstrative embodiments, I/Q imbalance compensator 202 may be configured to compensate for the effect of I/Q impairment model 204. For example, I/Q imbalance compensator 202 may be configured to apply a first calibration parameter, denoted $\tilde{a}$, which may be related to both gain imbalance and phase imbalance, to compensate for an estimated leakage from Q branch 208 to I branch 206, and a second calibration parameter, denoted $\tilde{b}$, to compensate for a gain imbalance of Q branch 208.

In some demonstrative embodiments, I/Q imbalance calibrator 140 (FIG. 1) may provide to Tx I/Q imbalance compensator 126 (FIG. 1) a plurality of Tx calibration parameters including and/or representing a first Tx calibration parameter, denoted $\tilde{a}_{Tx}$, to compensate for an estimated coupling between the I and Q branches of Tx path 120 (FIG. 1), and a second Tx calibration parameter, denoted $\tilde{b}_{Tx}$, to compensate for an gain of the Q branch of Tx path 120 (FIG. 1).

In some demonstrative embodiments, I/Q imbalance calibrator 140 (FIG. 1) may provide to Rx I/Q imbalance compensator 130 (FIG. 1) a plurality of Rx calibration parameters including and/or representing a first Rx calibration parameter, denoted $\tilde{a}_{Rx}$, to compensate for an estimated coupling between the I and Q branches of Rx path 122 (FIG. 1), and a second Rx calibration parameter, denoted $\tilde{b}_{Rx}$, to compensate for an gain of the Q branch of Rx path 122 (FIG. 1).

For example, I/Q imbalance calibrator 140 (FIG. 1) may provide to Tx I/Q imbalance compensator 126 (FIG. 1) a plurality of Tx calibration parameters including a first Tx calibration parameter, denoted $\hat{a}_{Tx}$, and a second Tx calibration parameter, denoted $\hat{b}_{Tx}$. I/Q imbalance calibrator 140 (FIG. 1) may provide to Rx I/Q imbalance compensator 130 (FIG. 1) a plurality of Rx calibration parameters including a first Rx calibration parameter, denoted $\hat{a}_{Rx}$, and a second Rx calibration parameter, denoted $\hat{b}_{Rx}$. The calibration parameters $\tilde{a}_{Tx}$, $\tilde{b}_{Tx}$, $\tilde{a}_{Rx}$ and $\tilde{b}_{Rx}$ may be defined, for example, as follows:

$$\tilde{a}_{Tx} = \frac{\hat{a}_{Tx}}{\hat{b}_{Tx}} \quad (8)$$

$$\tilde{b}_{Tx} = \frac{1}{\hat{b}_{Tx}}$$

$$\tilde{a}_{Rx} = \frac{\hat{a}_{Rx}}{\hat{b}_{Rx}} \quad (9)$$

$$\tilde{b}_{Rx} = \frac{1}{\hat{b}_{Rx}}$$

In some demonstrative embodiments, the plurality of calibration parameters, e.g., the calibration parameters $\tilde{a}$ and $\tilde{b}$, may not entirely mitigate the I/Q imbalance impairment. For example, an actual distorted signal, denoted $m_{COM}(t)$, resulting from the combination of the I/Q imbalance and the compensation applied by compensator I/Q imbalance compensator 202 may be determined, e.g., as follows:

$$m_{COM}(t)=\alpha m(t)+\beta m^*(t) \quad (10)$$

wherein $\alpha$ and $\beta$ are defined above in Equation 6.

Referring back to FIG. 1, in some demonstrative embodiments, an output, denoted $m_{Tx}(t)$, of Tx I/Q imbalance compensator 126 may be determined as follows, e.g., based on Equation 10:

$$m_{Tx}(t)=\alpha_{Tx}m(t)+\beta_{Tx}m^*(t) \quad (11)$$

wherein $\alpha_{Tx}$ and $\beta_{Tx}$ denote a gain imbalance factor and a phase imbalance factor, respectively, corresponding to the I/Q impaired signal compensated by Tx I/Q imbalance compensator 126 according to the Tx calibration parameters.

In some demonstrative embodiments, an output, denoted $m_{shifter}$, of loopback filter 128 responsive to the signal $m_{Tx}(t)$ may be determined, e.g., as follows:

$$m_{Shifter}(t)=\alpha_{Tx}m(t)e^{j\phi}+\beta_{Tx}m^*(t)e^{j\phi} \quad (12)$$

wherein $\phi$ denotes the phase shift applied by loopback filter 128.

In some demonstrative embodiments, an output, denoted $m_{Rx}(t)$, of Rx I/Q imbalance compensator 130 may be determined as follows, e.g., based on Equations 10 and 12:

$$m_{Rx}(t) = A\alpha_{Rx}m_{Shifter}(t) + A\beta_{Rx}m^*_{Shifter}(t) \quad (13)$$

$$= A\alpha_{Rx}\alpha_{Tx}e^{j\phi}m(t) + A\alpha_{Rx}\beta_{Tx}e^{j\phi}m^*(t) +$$

$$A\beta_{Rx}\alpha^*_{Tx}e^{-j\phi}m^*(t) + A\beta_{Rx}\beta^*_{Tx}e^{-j\phi}m(t)$$

$$= Am(t)(\alpha_{Tx}\alpha_{Rx}e^{j\phi} + \beta_{Rx}\beta^*_{Tx}e^{-j\phi}) +$$

$$Am^*(t)(\alpha_{Rx}\beta_{Tx}e^{j\phi} + \beta_{Rx}\alpha^*_{Tx}e^{-j\phi})$$

wherein $\alpha_{Rx}$ and $\beta_{Rx}$ denote a gain imbalance factor and a phase imbalance factor, respectively, corresponding to the I/Q impaired signal compensated by Rx I/Q imbalance compensator 130 according to the Rx calibration parameters; and wherein A denotes an equivalent gain between Tx path 120 and Rx path 122.

In some demonstrative embodiments, a phasor, denoted $\gamma(\phi)$, of an image component $m^*(t)$ of the signal $m_{Rx}(t)$ according to Equation 13 may be defined, e.g., as follows:

$$\gamma(\phi)=A(\alpha_{Rx}\beta_{Tx}e^{j\phi}+\beta_{Rx}\alpha^*_{Tx}e^{-j\phi}) \quad (14)$$

In some demonstrative embodiments, a power, denoted $|\gamma(\phi)|^2$, of the phasor $\gamma(\phi)$ may be determined, e.g., as follows:

$$|\gamma(\phi)|^2=A^2(|\alpha_{Rx}\beta_{Tx}|^2+|\beta_{Rx}\alpha^*_{Tx}|^2+2Re[\alpha_{Rx}\beta_{Tx}\beta^*_{Rx}\alpha_{Tx}e^{-j2\phi}]) \quad (15)$$

In some demonstrative embodiments, the power $|\gamma(\phi)|^2$ may correspond to a first phasor of an image component of a first phase state of a signal, which is shifted by loopback filter 128 by a first phase shift. For example, the power $|\gamma(\phi)|^2$ may correspond to the first signal shifted by loopback filter 128 by the first phase shift at the first calibration state, e.g., as described above.

In some demonstrative embodiments, another power, denoted $|\gamma(\phi+\pi/2)|^2$, may correspond to a second phasor of an image component, denoted $\gamma(\phi+\pi/2)$, of a second phase state of a signal, which is shifted by loopback filter 128 by a second phase shift, which is 90 degrees greater than the first phase shift. For example, the power $|\gamma(\phi+\pi/2)|^2$ may correspond to the second signal shifted by loopback filter 128 by the second phase shift at the second calibration state, e.g., as described above.

In some demonstrative embodiments, the power $|\gamma(\phi+\pi/2)|^2$ may be determined based on Equation 15, for example, as follows, e.g., assuming equal gain A in both the first and second phase states:

$$\left|\gamma\left(\phi+\frac{\pi}{2}\right)\right|^2 = A^2(|\alpha_{Rx}\beta_{Tx}|^2 + |\beta_{Rx}\alpha^*_{Tx}|^2 - 2\text{Re}\{\alpha_{Rx}\beta_{Tx}\beta^*_{Rx}\alpha_{Tx}e^{-j2\phi}\}) \quad (16)$$

In some demonstrative embodiments, a sum, denoted $\gamma_{sum}$, of the power of the first phasor and the power of the second phasor may be determined, e.g., as follows:

$$\gamma_{sum} = |\gamma(\phi)|^2 + \left|\gamma\left(\phi+\frac{\pi}{2}\right)\right|^2 = 2A^2(|\alpha_{Rx}|^2|\beta_{Tx}|^2 + |\beta_{Rx}|^2|\alpha_{Tx}|^2) \quad (17)$$

In some demonstrative embodiments, that the sum $\gamma_{sum}$, e.g., according to Equation 17, may be independent of the value of the phase $\phi$.

In some demonstrative embodiments, that the sum $\gamma_{sum}$, according to Equation 17, may be reduced, for example, if both phase imbalance factors $\beta_{Tx}$ and $\beta_{Rx}$ are reduced.

For example, the sum $\gamma_{sum}$, according to Equation 17, may be equal to zero, for example, if and only if both phase imbalance factors $\beta_{Tx}$ and $\beta_{Rx}$ are equal to zero, e.g., assuming that the gain imbalance factors $\alpha_{Tx}$ and $\alpha_{Rx}$ are non-zero.

Accordingly, in some demonstrative embodiments, the sum $\gamma_{sum}$ may be equal to zero, for example, if and only if both the I/Q imbalance of Tx path 120 and the I/Q imbalance of Rx path 122 are compensated, e.g., fully compensated.

Therefore, in some demonstrative embodiments, the sum $\gamma_{sum}$ may be utilized as a cost function for joint Tx/Rx I/Q imbalance calibration of Tx path 120 and Rx path 122.

In some demonstrative embodiments, I/Q imbalance calibrator 140 may determine the Tx calibration parameters $\hat{a}_{Tx}$, $\hat{b}_{Tx}$ and the Rx calibration parameters $\hat{a}_{Rx}$ and $\hat{b}_{Rx}$, for example, such that the sum $\gamma_{sum}$ is minimized.

For example, I/Q imbalance calibrator 140 may determine the Tx calibration parameters $\hat{a}_{Tx}$, $\hat{b}_{Tx}$ and the Rx calibration parameters $\hat{a}_{Rx}$ and $\hat{b}_{Rx}$ according to the following criterion:

$$[\hat{a}_{Rx}, \hat{b}_{Rx}, \hat{a}_{Tx}, \hat{b}_{Tx}] = \mathrm{argmin}_{a_{Rx}, b_{Rx}, a_{Tx}, b_{Tx}} \gamma_{sum}(\tilde{a}_{Rx}, \tilde{b}_{Rx}, \tilde{a}_{Tx}, \tilde{b}_{Tx}) \quad (18)$$

In some demonstrative embodiments, I/Q imbalance calibrator 140 may determine the Tx calibration parameters $\hat{a}_{Tx}$, $\hat{b}_{Tx}$ and the Rx calibration parameters $\hat{a}_{Rx}$ and $\hat{b}_{Rx}$ by an iterative method, e.g., as described below. However, in other embodiments, I/Q imbalance calibrator 140 may determine the Tx calibration parameters $\hat{a}_{Tx}$, $\hat{b}_{Tx}$ and the Rx calibration parameters $\hat{a}_{Rx}$ and $\hat{b}_{Rx}$ by using any other suitable method, e.g., a multi-dimensional optimization method.

In some demonstrative embodiments, I/Q imbalance calibrator 140 may determine the Tx calibration parameters $\hat{a}_{Tx}$, $\hat{b}_{Tx}$ and the Rx calibration parameters $\hat{a}^{Rx}$ and $\hat{b}_{Rx}$ by iterating over the calibration parameters $\hat{a}_{Tx}$, $\hat{b}_{Tx}$, $\hat{a}_{Rx}$ and $\hat{b}_{Rx}$, e.g., since iterating over only one parameter may potentially result in suboptimal estimation of the other three parameters.

Figure 3:
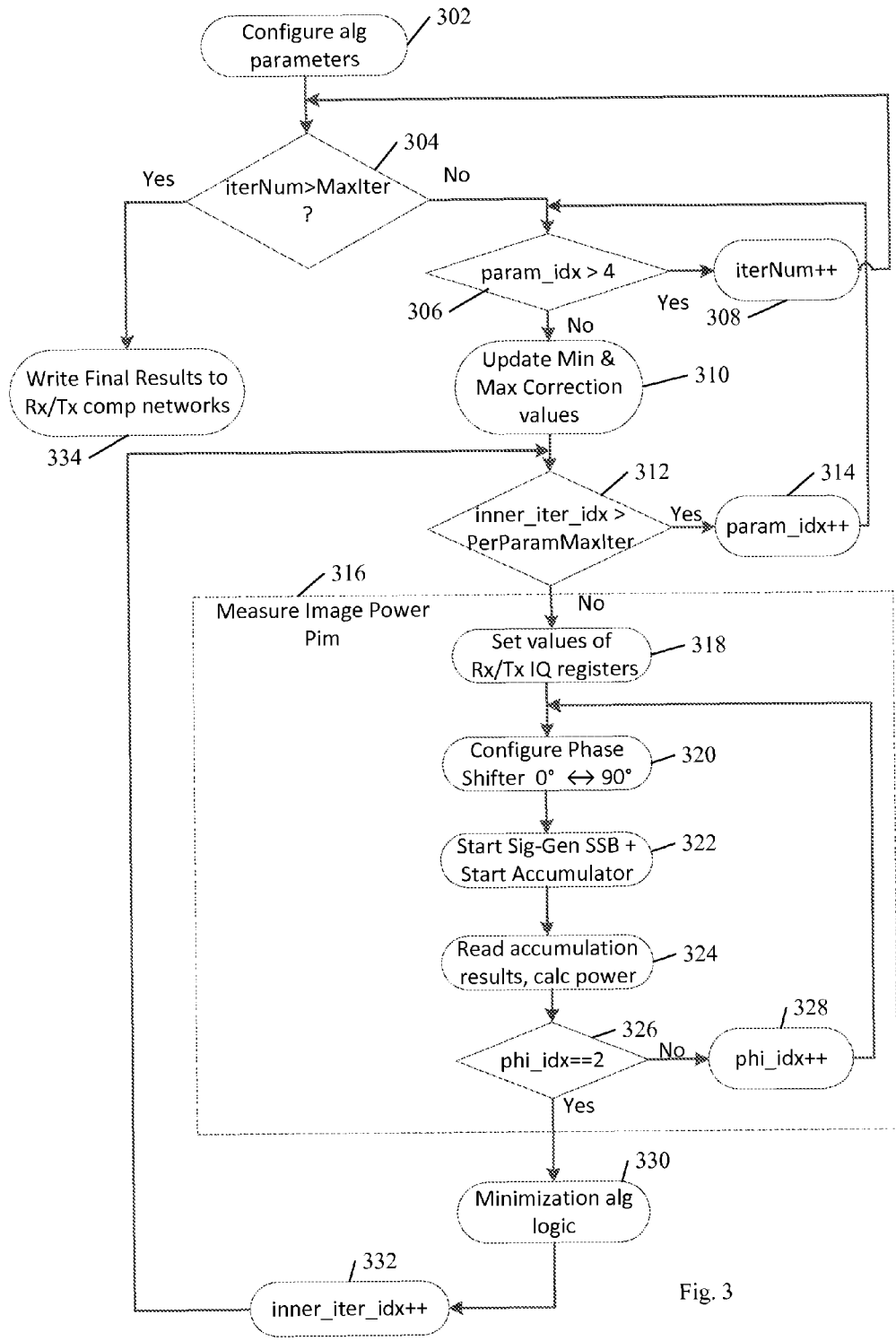
FIG. 3 is a schematic flow-chart illustration of a method of calibrating an I/Q imbalance, in accordance with some demonstrative embodiments.

Reference is made to FIG. 3, which schematically illustrates a method of calibrating an I/Q imbalance, in accordance with some demonstrative embodiments. In some demonstrative embodiments, one or more of the operations of the method of FIG. 3 may be performed by a wireless communication system, e.g., system 100 (FIG. 1), a wireless communication device, e.g., device 102 (FIG. 1), a transceiver, e.g., transceiver 110, and/or a calibrator, e.g., calibrator 140 (FIG. 1).

As indicated at block 302, the method may include configuring one or more algorithm parameters. For example, I/Q imbalance calibrator 140 (FIG. 1) may configure the frequency w to be utilized by SSB generator 124 (FIG. 1); a segment length, e.g., a length of the SSB signal; a number of iterations to be performed for determining the calibration parameters $\hat{a}_{Tx}$, $\hat{b}_{Tx}$, $\hat{a}_{Rx}$ and $\hat{b}_{Rx}$, e.g., a number of inner and/or global iterations, as described below; and/or any other parameter. In other embodiments, one or more parameters my be predefined and/or pre-set, e.g., such that configuration of the one or more parameters may not be required.

As indicated at block 304, the method may include performing a global iteration loop for a predefined number of times, denoted MaxIter. The global iteration loop may include, for example, iterating over all calibration parameters, e.g., as described below. The number of global iteration loops may be determined, for example, to provide a particular accuracy level. The number of global iteration loops may be determined, for example, based on simulation. In one example, the number of global iteration loops may be MaxIter=3 or any other number.

As indicated at block 306, the method may include determining whether or not all calibration parameters have been iterated during a global iteration loop, e.g., if the global iteration loop has not been performed for the predefined number of times MaxIter. The number of calibration parameters may be equal to four, e.g., including the two Tx calibration parameters $\hat{a}_{Tx}$ and $\hat{b}_{Tx}$, and the two Rx calibration parameters $\hat{a}_{Rx}$ and $\hat{b}_{Rx}$, e.g., as described above. In other embodiments, any other number of calibration parameters may be utilized.

As indicated at block 308, the method may include increasing an index of the global iteration loop, denoted IterNum, e.g., if all calibration parameters have been iterated during the global iteration loop.

As indicated at block 310, the method may include defining an iteration range to be scanned for a particular parameter of the plurality of calibration parameters. For example, the range may be defined by a minimum value and a maximum value. In one example, a range corresponding to the parameter $\hat{a}_{Tx}$ and/or the parameter $\hat{a}_{Rx}$, may be defined by a first range value, denoted a_min, and a second range value, denoted a_max; and/or a range corresponding to the parameter $\hat{b}_{Tx}$ and/or the parameter $\hat{b}_{Rx}$ may be defined by a first range value, denoted b_min, and a second range value, denoted b_max. For example, the range values may be initially set to predefined value, e.g., a_min=−1, a_max=1, b_min=0.5, and/or b_max=2. The range values may be updated, e.g., every iteration, for example, to decrease the ranges, e.g., by half with respect to a previous iteration.

As indicated at block 312, the method may include performing an inner iteration loop for a predefined number of times, denoted PerParamMaxIter. The inner iteration loop may include, for example, iterating over the particular parameter, e.g., as described below. The number of inner iteration loops may be determined, for example, to provide a particular accuracy level. The number of inner iteration loops may be determined, for example, based on simulation. In one example, the number of inner iteration loops may be PerParamMaxIter=10 or any other number.

As indicated at block 314 the method may include proceeding to process a next calibration parameter, e.g., if the inner iteration loop was performed for the predefined number of times PerParamMaxIter with respect to the particular calibration parameter.

As indicated at block 316, the method may include measuring the power ("image power"), denoted Pim, of the image component of the first and second phasors $\gamma(\phi)$ and $\gamma(\phi+\pi/2)$ corresponding to a particular set of the calibration parameters.

As indicated at block 318, measuring the power Pim include setting the particular set of calibration parameters. For example, I/Q imbalance calibrator 140 (FIG. 1) may set registers of Tx I/Q imbalance compensator 126 (FIG. 1) and Rx I/Q imbalance compensator 130 (FIG. 1) to the particular set of calibration parameters.

As indicated at block, 320, the method may include configuring the phase shift to be applied the signal looped back from the Tx path to the Rx path. For example, I/Q imbalance calibrator 140 (FIG. 1) may control loopback filter 128 (FIG. 1) to apply the phase shift $\phi=\phi_1$, e.g., as described above.

As indicated at block 322, the method may include generating a first SSB signal and accumulating the measurements corresponding to the phasor of the first SSB signal. For example, I/Q imbalance calibrator 140 (FIG. 1) may control SSB generator 124 (FIG. 1) to generate the first SSB signal, and accumulator 134 (FIG. 1), to accumulate the first phasor corresponding to the first SSB signal, e.g., as described above.

As indicated at block 324, the method may include determining a first power Pim corresponding to the first phasor. For example, I/Q imbalance calibrator 140 (FIG. 1) may determine the power $|\gamma(\phi)|^2$ corresponding to the first SSB signal, e.g., as described above.

As indicated at blocks 326 and 328, the method may include repeating the operations of blocks 320, 322 and 324 to determine a second power Pim with respect to a second SSB signal shifted by a second phase shift. For example, I/Q imbalance calibrator 140 (FIG. 1) may determine the power $|\gamma(\phi+\pi/2)|^2$ corresponding to the second SSB signal, e.g., as described above.

As indicated 330, the method may include minimizing a sum of the first and second powers with respect to the particular calibration parameter. For example, I/Q imbalance calibrator 140 (FIG. 1) may determine a value of the particular calibration parameter minimizing the sum $\gamma_{sum}$.

In some demonstrative embodiments, minimizing the sum of the first and second powers with respect to the particular calibration parameter may include finding a value of the particular calibration parameter, which minimizes the sum, according to a Golden selection algorithm, e.g., as described below. In other embodiments, any other algorithm may be used. For example, minimizing the sum of the first and second powers with respect to the particular calibration parameter may include finding a value of the particular calibration parameter, which minimizes the sum, according to a one-dimension minimization algorithm that uses successive bracketing, or any other algorithm.

In one example, the following Golden algorithm may be used for finding a value, denoted x2, of the particular calibration parameter, within the range [0,1], which minimizes the function $f(x)$, e.g., the sum $\gamma_{sum}$:

---

1. x0 = 0,  x1 = 0.38,  x2 = 0.62, x3 = 1
2. Get the function values: f(x1), f(x2)
3. If    f(x1) < f(x2)
    a. x3 = x2,    x2 = x1    (x0 stays x0, old x3 is discarded)
    b. x1 = 0.62*x0 + 0.38*x3    (new point between x0 and old x1)
   else ( f(x1) > f(x2) )
    a. x0 = x1,    x1 = x2    (x3 stays x3, old x0 is discarded)
    b. x2 = 0.38*x0 + 0.62*x3    (new point between x3 and old x2)
4. If converged or iteration number > MAX_ITER stop, else go to (2).

---

In some demonstrative embodiments, the Golden algorithm may result in the value x2 of the particular calibration parameter corresponding to a local minimum of the sum $\gamma_{sum}$. The golden algorithm may have a linear convergence is linear, e.g., every iteration the range is reduced by 0.62. The Golden algorithm may be robust to noisy functions, e.g., compared to algorithms that are based on derivative estimation using finite differences.

In some demonstrative embodiments, the method may include updating the particular set of values of the calibration parameters based on the determined value of the particular parameter. For example, the set of values may be updated to include the value x2 determined with respect to the particular calibration parameter.

As indicated at block 332, the method may include increasing an index of the inner iteration loop, denoted inner_iter_idx, and repeating the operations of blocks 312, 316 and 330, e.g., until reaching the predefined number of times PerParamMaxIter with respect to the particular calibration parameter.

As indicated at block 334, the method may include utilizing the plurality of calibration parameters for compensating signals communicated via the Tx and/or Rx paths, e.g., after performing the global iteration loops. For example, calibrator 140 (FIG. 1) may cause Tx I/Q imbalance compensator 126 (FIG. 1) to utilize the determined Tx calibration parameters when compensating a signal transmitted via Tx path 120 (FIG. 1); and/or calibrator 140 (FIG. 1) may cause Rx I/Q imbalance compensator 130 to utilize the determined Rx calibration parameters when compensating a signal received via Rx path 122 (FIG. 1).

Referring back to FIG. 1, in some demonstrative embodiments, the measurements and calculations with respect to the sum $\gamma_{sum}$, e.g., as described above, may be performed under an assumption that a phase difference between the phases $\phi_1$ and $\phi_2$ is 90 degrees and that there is an equal gain A in both the first and second phase states, e.g., as described above.

In some demonstrative embodiments, loop filter 128 may actually generate a phase difference between the phases $\phi_1$ and $\phi_2$, which is different from 90 degrees and/or loop filter 128 may actually generate a gain mismatch between the first and second phase states.

Figure 4:
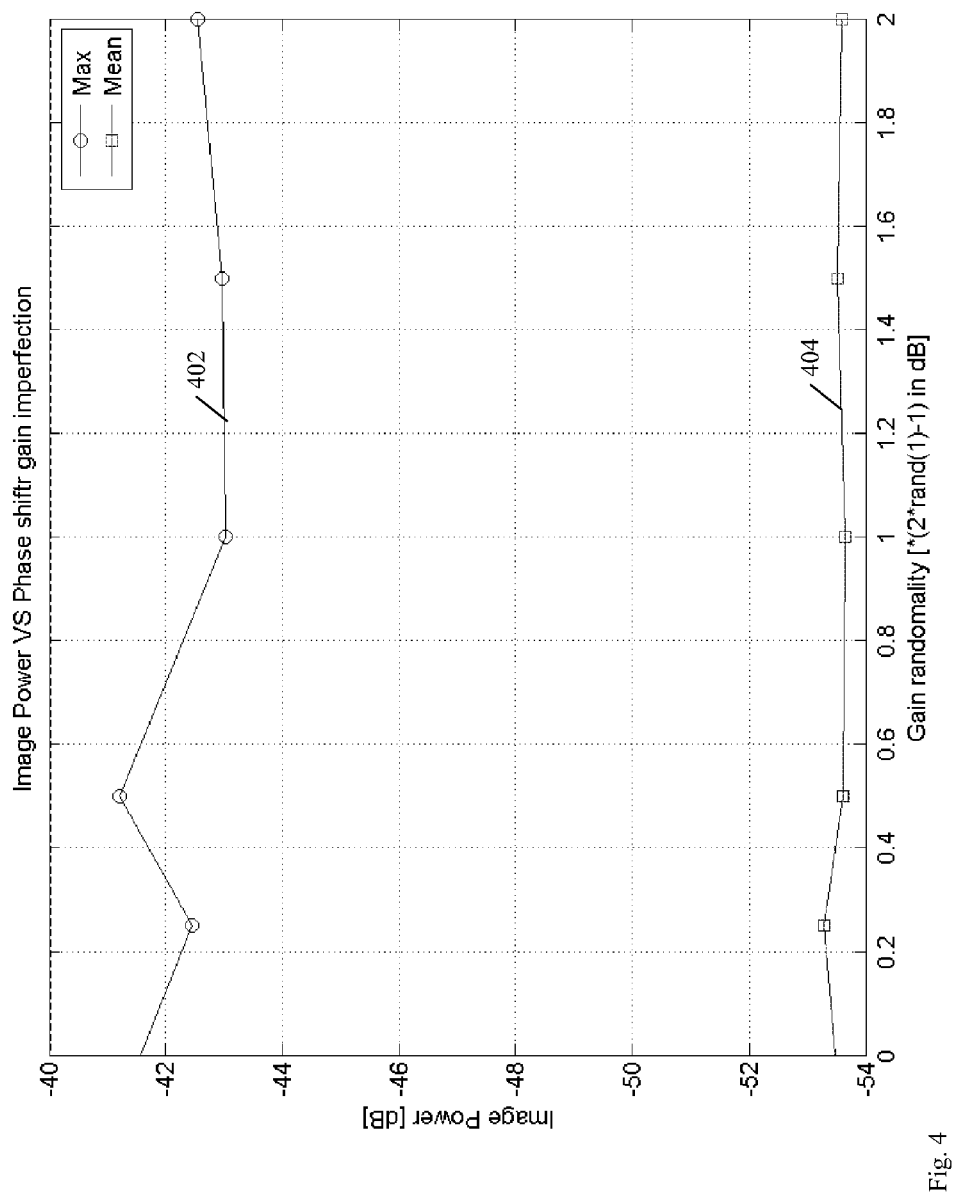
FIG. 4 is a schematic illustration of a graph depicting curves of maximal and mean simulated values of an error in an image power of a compensated signal versus a gain mismatch between first and second phase states applied to the compensated signal, in accordance with some demonstrative embodiments.

Reference is made to FIG. 4, which schematically illustrates a graph including a curve 402 depicting maximal simulated values of an error in the power Pim resulting from the residual gain and phase mismatch versus gain mismatch between the first and second phase states, and a curve 404 depicting mean simulated values of the error in the power Pim versus the gain mismatch between the first and second phase states, in accordance with some demonstrative embodiments.

Figure 5:
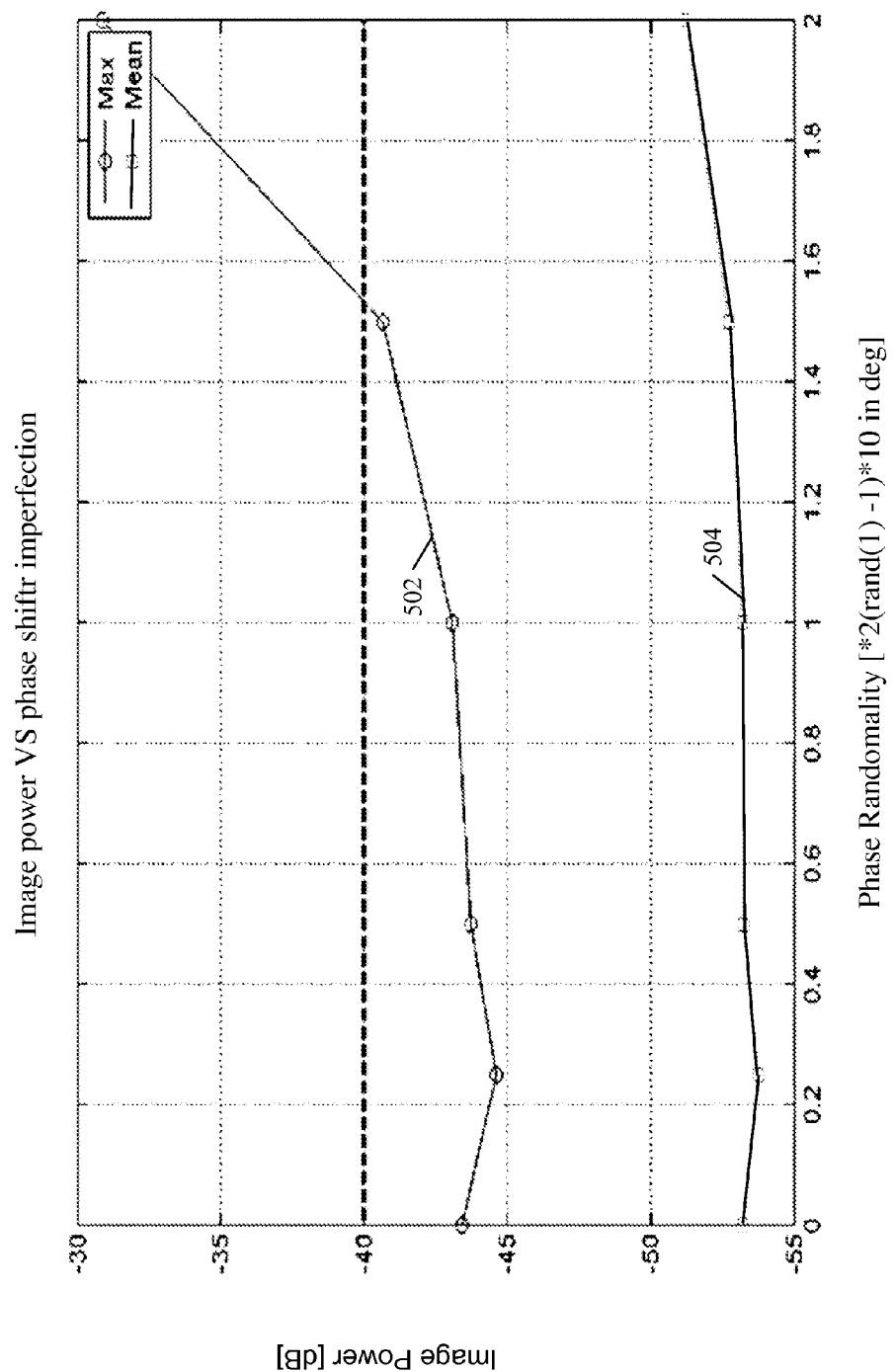
FIG. 5 is a schematic illustration of a graph depicting curves of maximal and mean simulated values of the error in the image power of the compensated signal versus a phase mismatch, in accordance with some demonstrative embodiments.

Reference is also made to FIG. 5, which schematically illustrates a graph including a curve 502 depicting maximal simulated values of an error in the power Pim resulting from the residual gain and phase mismatch versus phase mismatch of filter 128 (FIG. 1), and a curve 504 depicting mean simulated values of the error in the power Pim versus the phase mismatch of filter 128 (FIG. 1) relative to 90 degrees, in accordance with some demonstrative embodiments.

As shown in FIGS. 4 and 5, a gain mismatch of up to ±1 decibel (dB) and/or a phase mismatch of up to ±10 dB may result in the calculated Pim of up to −40 decibels relative to the carrier (dBc). Accordingly, the performance of calibrator 140 (FIG. 1) may not be substantially affected, e.g., filter 128 (FIG. 1) generates a difference of between 80 degrees and 100 degrees between the first and second phase shifts.

Figure 6:
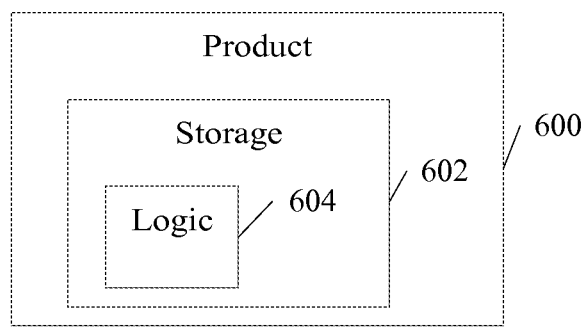
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), transceiver 110 (FIG. 1), and/or calibrator 140 (FIG. 1) and/or to perform one or more operations of the method of FIG. 3. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phasechange memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
an in-phase/quadrature (I/Q) imbalance calibrator to determine a plurality of calibration parameters to calibrate I/Q imbalance of both a Radio Frequency (RF) Receive (Rx) path of a transceiver and a RF Transmit (Tx) path of said transceiver, the plurality of calibration parameters including a plurality of Tx I/Q calibration parameters to be applied to said RF Tx path, and a plurality of Rx I/Q calibration parameters to be applied to said RF Rx path;
a Tx IQ imbalance compensator to apply said plurality of Tx I/Q calibration parameters to said RF Tx path;
an Rx IQ imbalance compensator to apply said Rx I/Q calibration parameters to said RF Rx path;
a Numerically Controlled Oscillator (NCO) to downconvert an output of said Rx IQ imbalance compensator;
a digital source to generate first and second signals in the form of Single Side Band (SSB) signals; and
an accumulator to generate a first phasor by accumulating an output of said NCO responsive to said first signal, and to generate a second phasor by accumulating an output of said NCO responsive to said second signal,
wherein the first phasor includes a phasor of an image component of the first signal transmitted via said RF Tx path, shifted by a first phase shift and received via said RF Rx path,
wherein the second phasor includes a phasor of an image component of the second signal transmitted via said RF Tx path, shifted by a second phase shift, different from said first phase shift, and received via said RF Rx path, and wherein the in-phase/quadrature (I/Q) imbalance calibrator is to determine the plurality of calibration parameters based on a sum of a first power and a second power, the first power including a power of said first phasor, and the second power including a power of said second phasor.

2. The apparatus of claim 1, wherein said I/Q imbalance calibrator is to determine said plurality of calibration parameters to minimize the sum of said first and second powers.

3. The apparatus of claim 2, wherein said I/Q imbalance calibrator is to determine said plurality of calibration parameters by iterating over phasors of a plurality of pairs of said first and second signals resulting from a plurality of different sets of values of said plurality of calibration parameters.

4. The apparatus of claim 3, wherein said I/Q imbalance calibrator is to set said plurality of calibration parameters to a set of values; to determine the sum of said first and second powers resulting from said set of values; to determine a value of a parameter of said plurality of calibration parameters for minimizing said sum; to update said set of values based on the determined value of said parameter; and to repeat said setting of said plurality of calibration parameters, said determining of the sum of said first and second powers, said determining of the value of said parameter and said updating said set of values with respect to the updated set of values.

5. The apparatus of claim 4, wherein said I/Q imbalance calibrator is to determine the value of said parameter for minimizing said sum according to a golden section algorithm.

6. The apparatus of claim 1, wherein a difference between said first and second phase shifts is between 80 and 100 degrees.

7. The apparatus of claim 6, wherein the difference between said first and second phase shifts is substantially 90 degrees.

8. A system comprising:
at least one wireless communication device including:
one or more antennas; and
a transceiver to communicate signals via said one or more antennas, the transceiver including:
a Radio Frequency (RF) transmit (Tx) path including a Tx in-phase/quadrature (I/Q) imbalance compensator to apply a plurality of Tx calibration parameters to said RF Tx path;
an RF receive (Rx) path including an Rx I/Q imbalance compensator to apply a plurality of Rx calibration parameters to said RF Rx path;
a loopback path to couple said RF Tx path to said RF Rx path with a phase shift, which is switchable between first and second phases;
a Numerically Controlled Oscillator (NCO) to downconvert an output of said Rx I/Q imbalance compensator;
a digital source to generate first and second signals in the form of Single Side Band (SSB) signals;
an accumulator to generate a first phasor by accumulating an output of said NCO responsive to said first signal, and to generate a second phasor by accumulating an output of said NCO responsive to said second signal, wherein the first phasor includes a phasor of an image component of the first signal compensated by said Tx I/Q imbalance compensator, shifted by the loopback path with said first phase shift and compensated by said Tx I/Q imbalance compensator, wherein the second phasor includes a phasor of an image component of the second signal compensated by said Tx I/Q imbalance compensator, shifted by the loopback path with said second phase shift and compensated by said Rx I/Q imbalance compensator; and an I/Q imbalance calibrator to determine a plurality of calibration parameters including said Tx and Rx calibration parameters based on a sum of a first power and a second power, the first power including a power of said first phasor, and the second power including a power of said second phasor.

9. The system of claim 8, wherein said I/Q imbalance calibrator is to determine said plurality of calibration parameters to minimize the sum of said first and second powers.

10. The system of claim 9, wherein said I/Q imbalance calibrator is to determine said plurality of calibration parameters by iterating over phasors of a plurality of pairs of said first and second signals resulting from a plurality of different sets of values of said Tx and Rx calibration parameters.

11. The system of claim 10, wherein said I/Q imbalance calibrator is to set said plurality of calibration parameters to a set of values; to determine the sum of said first and second powers resulting from said set of values; to determine a value of a parameter of said plurality of calibration parameters for minimizing said sum; to update said set of values based on the determined value of said parameter; and to repeat said setting of said plurality of calibration parameters, said determining of the sum of said first and second powers, said determining of the value of said parameter and said updating said set of values with respect to the updated set of values.

12. The system of claim 11, wherein said I/Q imbalance calibrator is to determine the value of said parameter for minimizing said sum according to a golden section algorithm.

13. The system of claim 8, wherein a difference between said first and second phase shifts is between 80 and 100 degrees.

14. A method comprising:
determining a plurality of calibration parameters to calibrate in-phase/quadrature I/Q imbalance of both a Radio Frequency (RF) Receive (Rx) path of a transceiver and a RF Transmit (Tx) path of said transceiver, the plurality of calibration parameters including a plurality of Tx I/Q calibration parameters to be applied by a Tx IQ imbalance compensator to said RF Tx path, and a plurality of Rx I/Q calibration parameters to be applied by an Rx IQ imbalance compensator to said RF Rx path, wherein determining the plurality of calibration parameters comprises:
generating first and second signals in the form of Single Side Band (SSB) signals;
causing a Numerically Controlled Oscillator (NCO) to downconvert an output of said Rx IQ imbalance compensator;
generating a first phasor by accumulating an output of said NCO responsive to said first signal;
generating a second phasor by accumulating an output of said NCO responsive to said second signal,
wherein the first phasor includes a phasor of an image component of the first signal transmitted via said RF Tx path, shifted by a first phase shift and received via said RF Rx path,
wherein the second phasor includes a phasor of an image component of the second signal transmitted via said RF Tx path, shifted by a second phase shift, different from said first phase shift, and received via said RF Rx path; and
determining the plurality of calibration parameters based on a sum of a first power and a second power, the first power including a power of said first phasor, and the second power including a power of said second phasor.

15. The method of claim 14 comprising determining said plurality of calibration parameters to minimize the sum of said first and second powers.

16. The method of claim 15, comprising determining said plurality of calibration parameters by iterating over phasors of a plurality of pairs of said first and second signals resulting from a plurality of different sets of values of said plurality of calibration parameters.

17. The method of claim 16 comprising:
setting said plurality of calibration parameters to a set of values;
determining the sum of said first and second powers resulting from said set of values;
determining a value of a parameter of said plurality of calibration parameters for minimizing said sum;
updating said set of values based on the determined value of said parameter; and
repeating said setting of said plurality of calibration parameters, said determining of the sum of said first and second powers, said determining of the value of said parameter and said updating said set of values with respect to the updated set of values.

18. The method of claim 17 comprising determining the value of said parameter for minimizing said sum according to a golden section algorithm.

19. A product including a non-transitory storage medium having stored thereon instructions that, when executed by a machine, result in:
determining a plurality of calibration parameters to calibrate in-phase/quadrature I/Q imbalance of both a Radio Frequency (RF) Receive (Rx) path of a transceiver and a RF Transmit (Tx) path of said transceiver, the plurality of calibration parameters including a plurality of Tx I/Q calibration parameters to be applied by a Tx IQ imbalance compensator to said RF Tx path, and a plurality of Rx I/Q calibration parameters to be applied by an Rx IQ imbalance compensator to said RF Rx path, wherein determining the plurality of calibration parameters comprises:
generating first and second signals in the form of Single Side Band (SSB) signals;
causing a Numerically Controlled Oscillator (NCO) to downconvert an output of said Rx IQ imbalance compensator;
generating a first phasor by accumulating an output of said NCO responsive to said first signal;
generating a second phasor by accumulating an output of said NCO responsive to said second signal,
wherein the first phasor includes a phasor of an image component of the first signal transmitted via said RF Tx path, shifted by a first phase shift and received via said RF Rx path, wherein the second phasor includes a phasor of an image component of the second signal transmitted via said RF Tx path, shifted by a second phase shift, different from said first phase shift, and received via said RF Rx path; and determining the plurality of calibration parameters based on a sum of a first power and a second power, the first power including a power of said first phasor, and the second power including a power of said second phasor.

20. The product of claim 19, wherein said instructions result in determining said plurality of calibration parameters to minimize the sum of said first and second powers.

21. The product of claim 20, wherein said instructions result in determining said plurality of calibration parameters by iterating over phasors of a plurality of pairs of said first and second signals resulting from a plurality of different sets of values of said plurality of calibration parameters.

22. The product of claim 21, wherein said instructions result in:

setting said plurality of calibration parameters to a set of values;

determining the sum of said first and second powers resulting from said set of values;

determining a value of a parameter of said plurality of calibration parameters for minimizing said sum;

updating said set of values based on the determined value of said parameter; and repeating said setting of said plurality of calibration parameters, said determining of the sum of said first and second powers, said determining of the value of said parameter and said updating said set of values with respect to the updated set of values.

23. The product of claim 22, wherein said instructions result in determining the value of said parameter for minimizing said sum according to a golden section algorithm.

* * * * *